US012723898B2

(12) United States Patent
Pleros et al.

(10) Patent No.: US 12,723,898 B2
(45) Date of Patent: Sep. 1, 2026

(54) OPTICAL INTERFEROMETRIC SENSING DEVICE IN PHOTONIC INTEGRATED CIRCUITS

(71) Applicants: Aristotle University of Thessaloniki—E.L.K.E. (Eidikos Logariasmos Kondiliwn Erevnas), Salonika (GR); University of Ioannina—E.L.K.E. (Eidikos Logariasmos Kondiliwn Erevnas), Ioannina (GR)

(72) Inventors: Nikolaos Pleros, Xalkida (GR); Dimosthenis Spasopoulos, Trilofos Thessalonikis (GR); Evangelia Chatzianagnostou, Nea Michaniona Thessalonikis (GR); Eleftherios Loidorikis, Ioannina (GR); Eleftheria Lampadariou, Ioannina (GR)

(73) Assignees: Aristotle University of Thessaloniki—E.L.K.E. (Eidikos Logariasmos Kondiliwn Erevnas), Salonika (GR); 2. University of Ioannina—E.L.K.e. (Eidikos Logariasmos Kondiliwn Erevnas), Ioannina (GR)

( * ) Notice: Subject to any disclaimer, the term of this patent is extended or adjusted under 35 U.S.C. 154(b) by 0 days.

(21) Appl. No.: 19/005,060

(22) Filed: Dec. 30, 2024

(65) Prior Publication Data

US 2025/0216223 A1 Jul. 3, 2025

(51) Int. Cl.
*G01D 5/353* (2006.01)

(52) U.S. Cl.
CPC ................................ *G01D 5/35329* (2013.01)

(58) Field of Classification Search
CPC ............. G01D 5/35329; G01N 21/553; G01N 21/774; G01N 2021/7776;
(Continued)

(56) References Cited

U.S. PATENT DOCUMENTS

2009/0214159 A1* 8/2009 Hyun .................. G02B 6/1226 977/932
2022/0049298 A1* 2/2022 Dubrovsky ........ G01N 21/6428

FOREIGN PATENT DOCUMENTS

WO WO2006/122402 A1 11/2006
WO WO2018/150205 A1 8/2018

OTHER PUBLICATIONS

Huang, Y., et al., "Design of Compact Mach-Zehnder Interferometer-Based Slow-Light-Enhanced Plasmonic Waveguide Sensors," J. Lightwave Tech. 2016;34(11):2796-2803.

(Continued)

*Primary Examiner* — Seung C Sohn
(74) *Attorney, Agent, or Firm* — Cermak & McGowan LLP; Malcolm K. McGowan

(57) ABSTRACT

Optical waveguide interferometric sensing device, esp. biosensor, in photonic integrated circuits apparatus, comprising a waveguide layer for receiving an optical signal and propagating said optical signal in accordance with a predetermined optical waveguide propagation mode, and a testing medium surface in communication with the waveguide layer and responsive to a testing medium for modifying at least one characteristic of the propagated optical signal in relation to a given parameter of said testing medium, whereby the modified characteristic of the propagated optical signal is measurable in view of determining the given parameter of said testing medium, wherein said device comprises biosensors, resp. photonic and plasmonic components (101, 102, 111) in specifically designed MZI configurations (101), especially planar plasmonic waveguides (111), which are
(Continued)

monolithically integrated in photonic integrated circuits, wherein it comprises Bragg-grating-based plasmonic waveguides (402, 502, 602, 609), which are co-integrated with photonic waveguides (102, 605, 606), which consist of integrated waveguides, wherein a slow light mechanism means is incorporated in the device being used with Bragg diffraction barrier means (602) in order to boost sensitivity to unprecedented levels retaining a short transducer length, wherein Bragg diffraction barrier means with a length of photonic waveguide in one MZI branch are incorporated in the device thereby increasing the free spectral range (FSR) for improving architectural sensitivity, as well as tailoring means for tailoring the photonic geometry, taking into account a second order dispersion in the plasmo-photonic MZI branches (605, 606).

20 Claims, 3 Drawing Sheets

(58) Field of Classification Search
CPC ....... G01N 2021/7779; G01N 21/7703; G01N 2021/7709; G01N 21/552; G01N 21/77; G02B 6/12004; G02B 6/1226; G02B 2006/12138; G02B 2006/12159
See application file for complete search history.

(56) References Cited

OTHER PUBLICATIONS

Huang, Y., et al., “Slow-light enhanced nanoscale plasmonic waveguide sensors and switches,” Proceedings of SPIE 2014, IEEE, US, Proceedings vol. 8988, Integrated Optics: Devices, Materials, and Technologies XVIII (Abstract only).
Qin, K., et al., “Slow Light-Mach-Zehnder Interferometer as Label-free Biosensor with Scalable Sensitivity,” Optics Letters 2016;41(4):753-756.
Huang, Y., et al., “Slow-light enhanced subwavelength plasmonic waveguide refractive index sensors,” Optics Express 2015;23(11):15 pp.
Chatzianagnostou, E., et al., “High-sensitivity plasmo-photonic interferometric sensors on a chip,” SPIE Proceedings 2020, SPIE, US, Conference 11284, 7 pp.
Search Report/Written Opinion from Greek Patent App. No. 20230101081 (Sep. 2, 2024).

* cited by examiner

OPTICAL INTERFEROMETRIC SENSING DEVICE IN PHOTONIC INTEGRATED CIRCUITS

FIELD OF THE INVENTION

The present invention relates to optical interferometric biosensors based on planar plasmonic waveguides integrated in photonic integrated circuits.

BACKGROUND OF THE INVENTION

Biological sensing plays an essential role in a broad range of application fields closely related to daily human life including medical diagnostics, pharmaceuticals, environmental monitoring and food safety. Among the different sensing technologies, optical sensors based on integrated optics and surface plasmon resonance (SPR) represent a highly attractive candidate that can fulfil the requirements for fast and precise detection of chemical and biological elements. However, broad commercial exploitation is still hampered due to bulky prism-based coupling configurations required for the SPR-based sensors or moderate sensitivities of integrated photonic sensors.

Two factors determine the sensitivity of optical sensors: the transducer waveguide sensitivity that represents the effective index change of the waveguide mode upon a change in the refractive index of the surrounding test analyte, and the device sensitivity which depends on the overall sensor circuit architecture. To this end, boosting the sensitivity to ultra-high values requires the optimization of both sensitivity factors building upon the optimal selection of both the waveguide structure and the circuit architecture.

The most common technique to boost device sensitivity in interferometric structures is to increase the sensing waveguide length in the order of several millimeters or even centimeters, which comes at the expense of compactness and operational robustness. Another technique is to optimize the optical path difference between the two arms and increase the free spectral range (FSR) [1-3].

On the other hand, the use of waveguides with enhanced evanescent field, like TM-operated photonic, slot-based, sub-wavelength grating (SWG) and plasmonic waveguides can improve waveguide sensitivity. However, among them, photonic structures still require sensing lengths into the centimeter scale in order to achieve high sensitivities [4-6].

In this context, the use of plasmonic transducers can offer significant benefits compared to photonic ones due to the profound exposure of plasmonic modes to the ambient environment that leads to stronger light-matter interaction. This unique feature makes plasmonic sensors extremely sensitive, yet at the expense of inherent high optical propagation loss setting severe limitations on the chip functionalities and limited miniaturization capabilities due to the bulky prism-based excitation schemes that are usually required negating system compactness.

The selective integration of plasmonic waveguides in the sensing arm of low-loss photonic interferometric structures has emerged as an attractive solution that could counterbalance the above limitations by leveraging the enhanced sensing characteristics of plasmonic waveguides with the low-loss passive circuitry portfolio of photonics to realize ultra-sensitive sensors in smaller footprints.

Following this approach, some approaches of plasmo-photonic sensors have been presented so far in either intensity-based sensor configurations [7] or interferometric based sensor layouts [8-10]. The first approach suggests Short-Range SPPs with bulk sensitivity equal to 1365 dB/RIU while on the second approach hybrid plasmonic slot waveguides [8,9] or hollow hybrid plasmo-photonic waveguides [10] are utilized, yielding bulk refractive index sensitivities up to 1060 nm/RIU [9].

Based on the same rationale, an integrated plasmo-photonic biosensor with multifunctional capabilities is disclosed in US20200003696A1/WO2018150205A8/GR20170100088A [3]. In particular, a plasmonic waveguide, either thin-film or slot, is integrated in the sensing arm of a photonic MZI. Optimal biasing and power balancing components in combination with a large FSR are proposed in order to enhance device sensitivity. However, a very large FSR over 1000 nm is needed in order to achieve the claimed record high sensitivities which poses several challenges. One challenge is that very precise control of the necessary extremely small path difference between the sensing and the reference branch is required, and potential fabrication structural variations are expected to have a notable effect on the sensor's performance.

Additionally, having ultra-high FSR structures may hamper the measurement process since the possibility that none of the spectral dips reside in the optical range of the interrogation instrument increases dramatically. Finally, the effect of temperature variations becomes bolder when targeting large FSR values requiring stricter temperature control.

The work presented in [11] demonstrates the experimentally obtained performance of a fabricated version of the biosensor described in the above patent with an FSR equal to 50 nm and a plasmonic sensing length of 70 μm. A bulk optical sensitivity of 4764 nm/RIU was achieved which is far below the value disclosed in said patent document and the state-of-the art bulk sensitivity of 59,000 nm/RIU achieved by the prism-based SPR sensor reported in [12].

The use of slow-light in sub-wavelength grating (SWG) waveguides was also proposed as a means to increase waveguide sensitivity in both photonic and plasmonic structures. SWGs with period $\Lambda$, can behave as homogeneous metamaterials in the long-wavelength regime ($\lambda >> \Lambda$), as Bragg mirrors in the band gap regime where mode propagation is forbidden ($\lambda \approx \Lambda$) or as slow-light waveguides near the band-edge at the band gap upper wavelength limit. The slow-light region is characterized by a group index nearly a magnitude higher compared to a conventional waveguide and a respective low group velocity—or large group delay—, which is associated with an increased light-matter interaction.

In [13] and in [14] the dispersion engineering of 1D SWG silicon waveguides was presented to operate close to the photonic band gap in order to enable a low group velocity and an increased light-matter interaction. However, the devices were not evaluated as refractive index (RI) or biosensors. Similarly in [15], a plasmonic Bragg grating based on a metal/air/metal structure with modulated gap between the metals (slot-based plasmonic Bragg) was designed in order to exhibit a flat dispersion curve for slow light propagation of the Bloch mode in the gap. However, the slow-light plasmonic waveguide investigated has not been evaluated as an RI or biosensor. Accordingly, in [16], a similar slot-based plasmonic Bragg waveguide sandwiched between two conventional slot (metal/dielectric/metal) waveguides was proposed as a slow-light-enhanced subwavelength refractive index sensor. It is shown that around 3.5 to 3.9 times enhancement in the RI sensitivity can be achieved in combination with 2 to 3 times reductions in the required sensing length. However, the proposed structure has not been investigated as the sensing transducer in the sensing branch of interferometers.

In [17], the slot-based plasmonic Bragg waveguide reported in the abovementioned work [16] "Slow-light enhanced subwavelength plasmonic waveguide refractive index sensors" is incorporated in the sensing branch of a plasmonic Mach-Zehnder interferometer which leads to approximately two times larger refractive index sensitivity than the standalone plasmonic Bragg waveguide. Additionally, almost an order of magnitude enhancement in the refractive index sensitivity, and therefore in the minimum detectable refractive index change, compared to the interferometric sensor using a conventional plasmonic slot waveguide is achieved.

In [18], a photonic slow light waveguide based on a one-dimensional (1D) crystal (phC) was incorporated in the sensing branch of a silicon-based photonic MZI. A fivefold refractive index sensitivity improvement was experimentally achieved compared to a traditional MZI sensor, accompanied with a 400 times reduction in footprint. However, the achieved spectral sensitivity of 103 nm/RIU is rather low.

A single-channel bimodal interferometer based on a 1D phC that supports two electromagnetic modes of the same polarization but with a large group velocity difference was proposed in [19]. The periodic structure was optimized so as to support a higher-order mode with a significantly reduced group velocity—acting as the sensing mode—compared to the fundamental mode—acting as the reference mode—. Due to the lower group velocity, the higher order mode is more sensitive to changes in the RI than the fundamental one. Similarly to the previous phC-based MZI, a low spectral sensitivity of 138.75 nm/RIU was achieved.

PRIOR ART

Several patent publications relate to the field identified above, which may be subdivided into different categories, among which the following disclosing interferometry, such as WO2020128293, EP3264070, US2004257579, WO2010010527, US2020200972, US2022050246, WO2007011384, GB2539017, CN212963389, WO9712225, WO2022164982, WO2018078404, WO2009115847, GB2437543 and WO2021152345.

The main feature of these publications is the use of one interferometer, such as Mach-Zehnder (MZI), Fabry-Pérot, Michelson, yet without plasmonic materials and Bragg diffraction barriers, which are not used therein, differentiating them from the presently aimed development proposed hereafter.

Another category including patent publications KR20120013821, KR20090006942, US2015308950, US2013329230, US2020278294, US2006045809, disclose plasmonic materials, such as metal films or nanoparticles, yet without using interferometry and Bragg diffraction barriers, which again differentiates them from the presently aimed development.

A still further category includes patent publications US2005018949, US2009214159, US2008056640, US2014218738, EP3988970, WO2018150205 disclosing interferometry and plasmonic materials, as well as WO2018150205, from which this new development differs by the incorporation of Bragg diffraction barriers and the slow light mechanism as set out below.

CN113253403 discloses interferometry and Bragg diffraction gratings. The main feature thereof is the incorporation of an interferometer Mach-Zehnder (MZI) together with Bragg diffraction gratings, but lacking plasmonic materials which is not disclosed therein and which therefore differentiates it from the present development.

WO2006122402 discloses interferometry, plasmonic materials and Bragg diffraction gratings, whereas this document is the only one among those cited that combines these features consisting of interferometry, plasmonic materials and Bragg diffraction barriers. However, the main difference with the aimed development is that it concerns optical fibers and not integrated waveguides. This translates into a larger size, which increases manufacturing complexity and limits the number of sensors that can be used simultaneously in a measurement, which both constitute a serious drawback.

XP011610431 of Huang Yin et al refers to "Design of Compact Mach-Zehnder Interferometer-Based Slow-Light-Enhanced Plasmonic Waveguide Sensors wherein the sensing area is based on a metal-dielectric-metal waveguide (MDM) and a system that uses the so-called electromagnetically induced transparency (EIT). This is a closed system, where the sensing waveguide comprises a plasmonic slot formed between two metallic areas and the sensing analyte flows through the slot region comprising the dielectric medium in the MDM configuration. This has a number of disadvantages when coming to sensing applications, since its sensing volume is very small as this is constrained only within the slot region formed between the two metallic areas. In addition its functionalization is very challenging and its accessibility to the analyte within the microfluidic channel is very limited.

AIM OF THE INVENTION

It is aimed with the present invention to remedy the abovementioned drawbacks, notably by incorporating a slow light mechanism which is used with the Bragg diffraction barriers, resulting in a targeted increase in sensitivity.

SUMMARY OF THE INVENTION

There is proposed according to the invention, an optical interferometric sensor, especially biosensor device in photonic integrated circuit apparatus comprising a waveguide layer for receiving an optical signal and propagating said optical signal in accordance with a predetermined optical waveguide propagation mode, and a testing medium surface in communication with the waveguide layer and responsive to a testing medium for modifying at least one characteristic of the propagated optical signal in relation to a given parameter of said testing medium, whereby the modified characteristic of the propagated optical signal is measurable in view of determining the given parameter of said testing medium. Said device is remarkable in that it comprises photonic and plasmonic components in specifically designed MZI configurations, especially planar plasmonic waveguides, which are monolithically integrated in photonic integrated circuits, and in that it comprises Bragg-grating-based plasmonic waveguides, which are co-integrated with photonic waveguides, which consist of integrated waveguides, wherein a slow light mechanism means is incorporated in the device being used with Bragg diffraction barrier means.

Thanks to the device proposed according to the invention, the manufacturing complexity is kept at a moderated level, to such an extent that the number of sensors that can be used simultaneously in a measurement is not too limited, which is a significant advantage. In addition, the slow light mechanism that is incorporated in the device is used with said Bragg diffraction barriers, which results in a noticeable increase in sensitivity, whereas said mechanism is not disclosed in any other former prior art publication mentioned above.

Accordingly, there is achieved according to the present invention a highly sensitive biosensor apparatus comprising new photonic and plasmonic components in specially designed MZI configurations and more remarkably, thanks to the adoption of Bragg-grating-loaded plasmonic waveguides as the means to increase the waveguide's sensitivity, which boosts the overall sensor's sensitivity to unprecedented levels retaining a short transducer length.

According to a particular embodiment of the device according to the invention, it comprises Bragg-grating-based plasmonic waveguides co-integrated with photonic waveguides aiming to boost sensitivity performance to >130,000 nm/RIU while reducing overall footprint and noise; and said FSR is selected larger than 100 nm, wherein the width of said photonic waveguide is optimized in combination with a large FSR, thereby bringing sensitivity close to 130,000 nm/RIU.

This roadmap is pursued through two parallel approaches for increasing both the architectural $S_a$ and the waveguide $S_{wg}$ sensitivity metrics and two alternative architectures layouts, the first one whereof consist of improvement of architectural sensitivity, which is obtained by increasing the FSR and tailoring the photonic waveguide geometry to take into account $2^{nd}$ order dispersion in the plasmo-photonic MZI branches, utilizing the recent projections obtained by the experimentally validated theoretical and simulation model reported in [20].

The second one consists of a waveguide sensitivity improvement, which is achieved according to an alternative embodiment of the invention, by adopting Bragg grating decorated plasmonic thin-film waveguides, expecting to exploit slow light phenomena for increasing the effective exposure of the plasmonic field to the overlying analyte.

According to a specific embodiment of the device of the invention, dielectric loadings are incorporated on top of the plasmonic stripe to produce a Bragg cavity configuration that maximize the effective exposure time of the plasmonic field. Preliminary simulations of enhanced sensitivity obtained with Pérot-Fabry-decorated plasmonic thin films are set out below.

According to a further embodiment of the device of the invention, a plasmonic stripe waveguide is incorporated within a photonic MZI sensor means.

According to a still further embodiment of the device of the invention, said plasmonic stripe waveguide has a width of few microns and a length of a few tens of microns.

According to a yet further embodiment of the device of the invention, it comprises Bragg-grating-based CMOS plasmonic waveguides co-integrated with photonic waveguides, whereby it boosts sensitivity performance to >130,000 nm/RIU while reducing overall footprint and noise, and said FSR is selected larger than 100 nm, esp. wherein the width of said photonic waveguide is optimized in combination with a large FSR, thereby bringing sensitivity close to 130,000 nm/RIU.

According to an alternative embodiment of the device of the invention, Bragg-grating-decorated plasmonic thin-film waveguides are incorporated, wherein slow light phenomena are exerted, thereby increasing the effective exposure of the plasmonic field to the overlining analyte, for increasing the waveguide and the architectural sensitivity.

According to an additional embodiment of the device of the invention, dielectric loadings are incorporated on top of said plasmonic stripe, thereby generating a Bragg cavity configuration maximizing the effective exposure time of the said plasmonic field.

According to a preferred embodiment of the device of the invention, Pérot-Fabry-decorated plasmonic thin films are incorporated enhancing sensitivity obtained, wherein the propagation of a surface plasmon mode is supported by an aluminum metallic film embedded within an aqueous solution, further wherein the sensitivity of the SPP mode to a surface modification is evaluated by applying a refractive index change, particularly of the order of $\Delta n=0.2$ to a $d=20$ nm-thick layer on top of the metal film over a finite propagation length L, further wherein for a thin film mode, said surface modification yields a phase change $\Delta\phi_F$ corresponding to a phase sensitivity of the thin-film SPP mode to surface modification of $$S_\phi = \Delta\phi_F/((\Delta nd)L) = 7{,}2e-3\ \text{rad}/(RIU\cdot\text{nm})/\mu\text{m},$$

further wherein applying same to SPP modes transmitted through plasmonic Pérot-Fabry cavities comprised of dielectric-loaded Bragg mirrors, notably with a period=1.1 μm and height=0.55 μm, yields an increased phase change $\Delta\phi_c$ from which a sensitivity enhancement factor $\eta=\Delta\phi_c/\Delta\phi_F$ with respect to bare thin film configuration is extracted.

According to another embodiment of the device of the invention, more periods, especially 2 or 3, are introduced by virtue whereof said factor scales with field enhancement within the cavity, further wherein coupled-cavities are deployed with SPP mode hopping from one cavity to the other, generating an improvement of the sensitivity by one order of magnitude resulting in that an ultra-high sensitivity of 130,000 nm/RIU is accomplished with either a shorter plasmonic waveguide lengths up to <40 μm reducing footprint and losses, or a smaller FSR up to <150 nm resulting in a device with increased tolerance.

According to a further specific embodiment of the device of the invention, a first configuration comprises a balanced Mach Zehnder interferometer MZI having both arms host identical photonic and plasmonic stripe waveguide sections, wherein dielectric ridges located on top of the plasmonic stripes enable slow-light propagation; further wherein to accommodate sensing, only one of the two plasmonic waveguides gets functionalization in order to serve as the sensing transducer, whereas the respective plasmonic waveguide in the reference branch is coated with blocking agents serving as a reference, so that when the liquid sample flows over both arms, binding events occur only in the sensing arm, resulting in local refractive index RI changes that are detected by the sensing waveguide; esp. further adding the same plasmonic waveguide in the reference arm, thereby both enhancing sensitivity and improving the limit of detection.

The above approaches can be applied in two alternative interferometric layouts that are schematically depicted in FIGS. 6 and 7 respectively. The first configuration of FIG. 6 comprises a conventional, balanced Mach Zehnder interferometer MZI where both arms host identical photonic and plasmonic stripe waveguide sections. Dielectric ridges are located on top of the plasmonic stripes to enable slow-light propagation, as described previously. To accommodate sensing, only one of the two plasmonic waveguides requires functionalization in order to serve as the sensing transducer, whereas the respective plasmonic waveguide in the reference branch needs to be coated with blocking agents serving as a reference. In this way, when the liquid sample flows over both arms, binding events occur only in the sensing arm, resulting in local refractive index RI changes that can be detected by the sensing waveguide. Adding the same plasmonic waveguide in the reference arm offers two benefits that contribute to sensitivity enhancement and improvement of the limit of detection: at first, optical losses between the two branches become balanced, leading to a high extinction ratio at the interferometer output [1], [10]. Secondly, noise originating from temperature variations, non-specific binding or varied bulk refractive index during sample loading are cancelled out [20], [21]. The thermo-optic phase shifters that are employed at every MZI branch, allow for aligning the MZI resonance within the spectral window of the light source. The noise-resilient character of the balanced MZI together with more advanced data processing and noise cancellation techniques employed at the electronic read-out system are then expected to allow low LoD values.

According to a still further embodiment of the invention, optical losses between the two branches are balanced, yielding a high extinction ratio at the interferometer output, and/or noise originating from temperature variations, non-specific binding or varied bulk refractive index during sample loading are cancelled out.

According to a yet further embodiment of the invention, the thermo-optic phase shifters that are employed at every MZI branch allow for aligning the MZI resonance within the spectral window of the light source, especially wherein the noise-resilient character of the balanced MZI together with more advanced data processing and noise cancellation techniques employed at the electronic read-out system then allow for low LoD values.

According to an additional embodiment of the invention, a second configuration of an alternative noise-resilient architecture includes the deployment of a single-arm bimodal interferometer, wherein two access photonic waveguides are provided that are separated by a metal stripe located on top of thinner photonic layer, further wherein a dielectrically loaded Bragg-cavity is incorporated on the top-interface of the plasmonic stripe waveguide, at the plasmonic region whereof, two metal/insulator interfaces are formed to support SPP modes, esp. wherein the Bragg cavity on the top surface is designed so as to support a plasmonic Bloch mode exhibiting slow light propagation that enhances light-matter interaction and increase waveguide sensitivity, further wherein upon excitation, these modes interfere at the output photonic waveguide thus realizing the targeted single-arm interferometer, further wherein the said top metal surface serves as the sensing arm, while the bottom surface has the role of the reference arm, thus generating a bimodal configuration reducing the sensor footprint.

The sensor proposed according to the invention has fundamental differences compared to the sensor disclosed in document XP011610431 which are significant. The first major difference lies in the structure of the sensor itself and, more precisely, in the configuration of the sensing area that leads to different propagation mode properties and as such different sensing characteristics. In contrast, the sensing region of the proposed sensor employs a completely different waveguide platform that comprises an open metallic stripe with dielectric Bragg grating structures integrated on top. This waveguide platform supports the propagation of thin-film surface plasmon polariton referred to as SPP, that have a higher overlap with the surrounding liquid analyte compared to the plasmonic slot waveguide modes. This allows for an increased interaction between the plasmonic mode and the analyte, increasing the interaction volume compared to the MDM configuration. Moreover, its larger interaction volume facilitates its functionalization and its accessibility to the microfluidic channel.

Regarding the second important difference in the mechanism utilized for enhancing sensitivity, both sensors yet utilize the slow light phenomenon, where slowing down the light increases its interaction time with the analyte and thereby increases sensitivity, but the mechanisms XP011610431 uses EIT, while the present sensor uses periodic Bragg gratings forming arrays of cavities. These cavities create coupled cavity modes that allow for much greater light delay within them, resulting in significantly improved sensor sensitivity. This improvement occurs in close proximity to the metallic surface, a critical factor for bioapplications. In such applications, the functionalization of the detection surface with suitable receptors is required to achieve selective detection of specific analytes. High sensitivity in this region is essential. In addition, the use of periodic Bragg gratings increases the detection area through the sidewalls of the Bragg structures, which is another advantage for biosensors.

Another advantage of the proposed platform is the ease of fabrication, notably with the method of the invention, which significantly reduces production costs. This cost efficiency is a key feature for the commercial success of a sensor. In short, the proposed sensor is not only fundamentally different from the sensor in XP011610431, but also superior in its characteristics and performance, making it an ideal choice for use as a biosensor.

WO2018/150205A1 relates to an Integrated Plasmo-Photonic Biosensor and a Method of Use thereof. This invention differs significantly therefrom by the use of Bragg diffraction gratings and the slow light mechanism. These innovations fundamentally change the structure of the sensing surface of the sensor and significantly improve its qualitative properties.

The integration of periodic diffraction gratings over the metallic plasmonic waveguides enables the formation of cavities and the emergence of coupled cavity modes. This leads to greater slow light effects, which prolongs the interaction time of the light with the substance to be detected. Consequently, the sensitivity of the sensor is improved by an order of magnitude.

Furthermore, the use of periodic diffraction gratings offers the additional advantage that the detection area is extended by the side walls of the Bragg structures. In short, the proposed sensor is not only different therefrom, but also superior due to its improved qualitative properties.

To summarize, the present invention proposes a device comprising specially designed MZI sensors with integrated Bragg-grating-based plasmonic sensing elements that exploit a slow-light-enforced phase accumulation mechanism. Adoption of such sensing elements allows ultra-high sensitivity with shorter sensing lengths and smaller FSRs compared to the formerly cited document WO2018150205A8 where an ultra-high FSR above 1000 nm is needed for the claimed extraordinary sensitivity. This, in parallel to dispersion engineered and perfectly balanced MZI designs or bimodal configurations comprise a complete method to achieve ultra-high sensitivities and robust sensing performance. The present invention combines interferometry, plasmonic materials and Bragg diffraction gratings. The differences of the present invention over this combination are significant and are set out below accordingly.

Further features and properties of the device according to the invention will appear from the more detailed description of an exemplary embodiment thereof and the drawings as appended hereto.

DESCRIPTION

Figure 1:
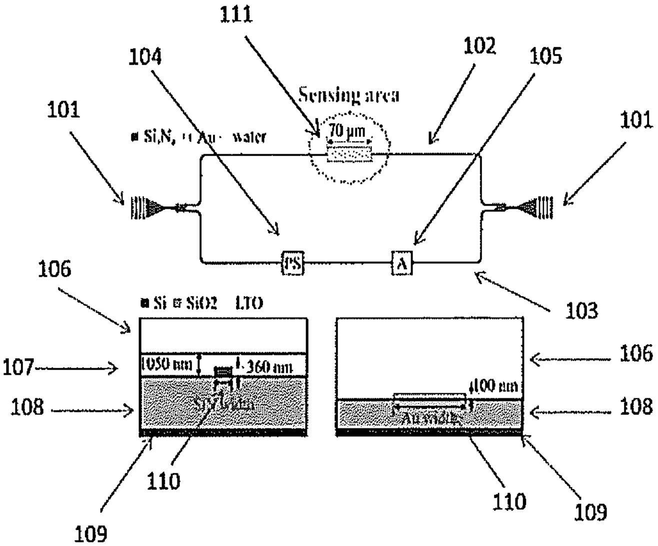
FIG. 1 is a schematic representation of a plasmo-photonic MZI sensor along with the cross-sections of the constituent photonic and plasmonic waveguides according to the invention.
Figure 2:
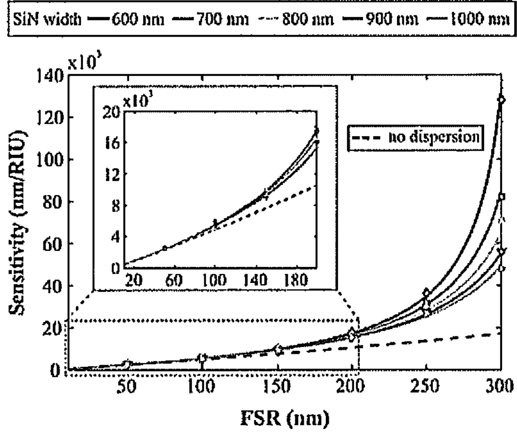
FIG. 2 is a graphic representation of sensitivity as a function of the MZI FSR for different photonic waveguide widths considering $2^{nd}$ order dispersion, thereby including a set of solid curves showing theoretical results with $2^{nd}$ order dispersion, respectively dots showing numerical simulation results, and dashed curve for no dispersion.

FIG. 2 illustrates the sensitivity performance as a function of the MZI FSR when incorporating a 7 μm-wide and 70 μm-long plasmonic stripe waveguide within a photonic MZI sensor as shown in FIG. 1 for different photonic waveguide geometries. It clearly indicates that when $2^{nd}$ order dispersion is taken into account and the FSR is larger than 100 nm, the sensitivity is not univocally defined by FSR but the dispersion characteristics of the waveguides play also a significant role. Exploiting these findings, sensitivity is expected to be brought close to 130,000 nm/RIU by simply optimizing the width of the photonic waveguide in combination with a large FSR of hundreds of nanometers.

Figures 3, 4, 5:
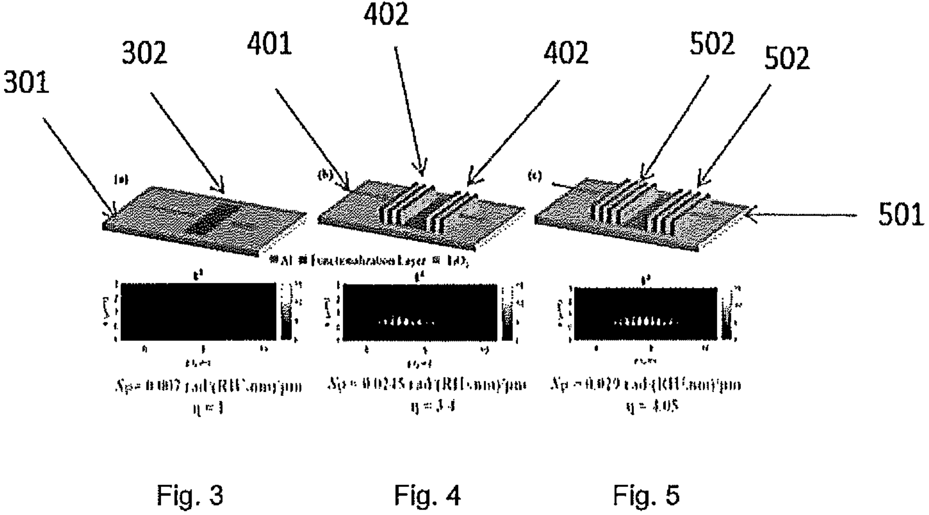
FIG. 3 represents a bare Aluminum plasmonic thin film with functionalization layer.
FIG. 4 represents an enhanced sensitivity of Bragg grating decorated Aluminum thin film with two periods Bragg mirror cavity.
FIG. 5 shows a similar view of enhanced sensitivity of Bragg grating decorated Aluminum thin films as in FIG. 4, yet with three periods Bragg mirror cavity.

Dielectric loadings are incorporated on top of the plasmonic stripe to produce a Bragg cavity configuration that maximize the effective exposure time of the plasmonic field. Preliminary simulations of enhanced sensitivity obtained with Pérot-Fabry-decorated plasmonic thin films are illustrated in FIGS. 4 and 5. FIG. 3 depicts the propagation of a surface plasmon mode supported by an aluminum metallic film embedded within an aqueous solution. The sensitivity of the SPP mode to a surface modification is evaluated by applying a refractive index change $\Delta n=0.2$ to a $d=20$ nm-thick layer on top of the metal film over a finite propagation length L. For a thin film mode, such a surface modification results in a phase change $\Delta\phi_F$ corresponding to a phase sensitivity of the thin-film SPP mode to surface modification of $$S_\phi = \Delta\phi_F/((\Delta nd)L) = 7{,}2e-3\ \text{rad}/(RIU\cdot\text{nm})/\mu\text{m}.$$

Applying the same approach to SPP modes transmitted through plasmonic Pérot-Fabry cavities comprised of dielectric-loaded Bragg mirrors—with period=1.1 μm, resp. height=0.55 μm—with reference to FIGS. 4 & 5, results in an increased phase change $\Delta\phi_c$ from which a sensitivity enhancement factor $\eta=\Delta\phi_c/\Delta\phi_F$ with respect to bare thin film configuration can be extracted. This factor scales with field enhancement within the cavity when more periods are introduced. By deploying coupled-cavities with SPP mode hopping from one cavity to the other, an improvement of the sensitivity by one order of magnitude is targeted meaning that the ultra-high sensitivity of 130,000 nm/RIU can be achieved with either shorter plasmonic waveguide lengths (<40 μm) reducing footprint and losses or a smaller FSR (<150 nm) resulting in a more tolerant device.

Figure 6:
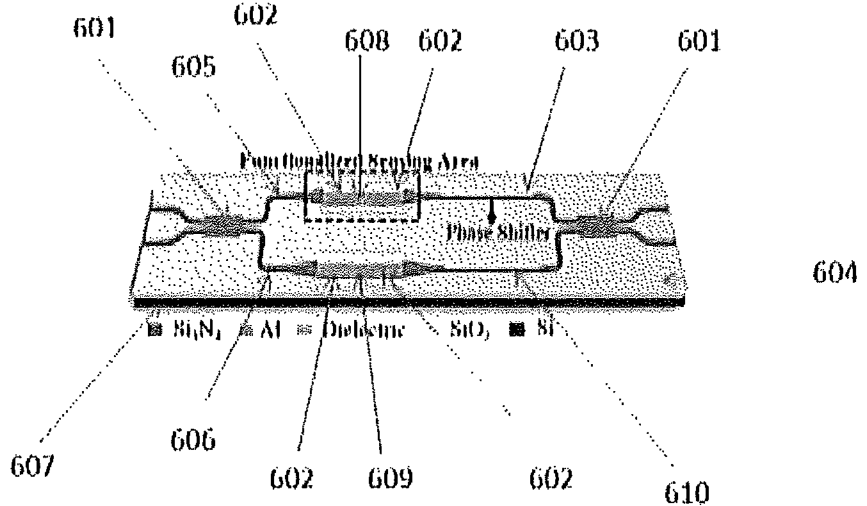
FIGS. 6 and 7 schematically depict two approaches to be applied in two alternative interferometric layouts thereof respectively.
Figure 7:
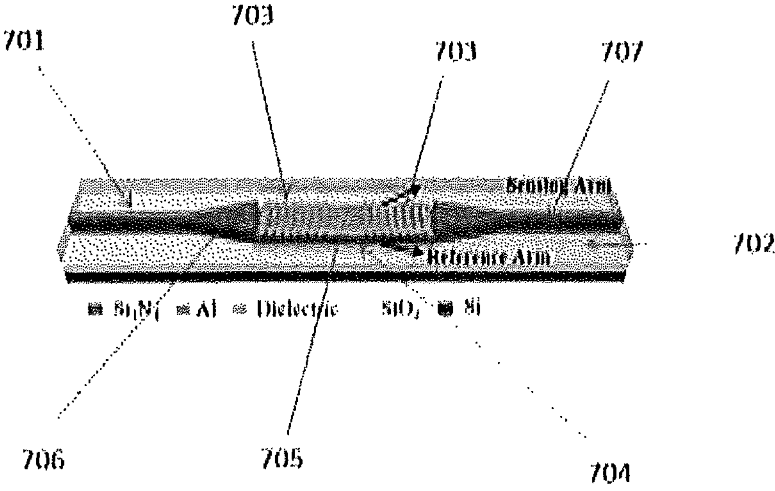

The above approaches can be applied in two alternative interferometric layouts that are schematically depicted in FIGS. 6 and 7 respectively. The first configuration of FIG. 6 comprises a conventional, balanced Mach Zehnder interferometer (MZI) where both arms host identical photonic and plasmonic stripe waveguide sections. Dielectric ridges 602 are located on top of the plasmonic stripes 608, 609 to enable slow-light propagation, as described previously. To accommodate sensing, only one of the two plasmonic waveguides 608 requires functionalization in order to serve as the sensing transducer, whereas the respective plasmonic waveguide 609 in the reference branch 606 needs to be coated with blocking agents serving as a reference. In this way, when the liquid sample flows over both arms 605, 606, binding events occur only in the sensing arm 605, resulting in local refractive index (RI) changes that can be detected by the sensing waveguide. Adding the same plasmonic waveguide in the reference arm 606 offers two benefits that contribute in sensitivity enhancement and improvement of the limit of detection: at first, optical losses between the two branches 605, 606 become balanced, leading to a high extinction ratio at the interferometer output [1], [10]. Secondly, noise originating from temperature variations, non-specific binding or varied bulk refractive index during sample loading are cancelled out [20], [21]. The thermo-optic phase shifters 603, 610 that are employed at every MZI branch, allow for aligning the MZI resonance within the spectral window of the light source. The noise-resilient character of the balanced MZI together with more advanced data processing and noise cancellation techniques employed at the electronic read-out system are then expected to allow for a spectral resolution of 10 pm and as such a LoD value lower than $10^{-8}$.

The alternative noise-resilient architecture shown in FIG. 7 concerns the deployment of a single-arm bimodal interferometer. This layout utilizes two access photonic waveguides 701, 707 that are separated by a metal stripe 705 located on top of an appropriately thinner photonic layer 704. A dielectrically loaded Bragg-cavity 703 is incorporated on the top-interface of the plasmonic stripe waveguide 705. At the plasmonic region, two metal/insulator interfaces are formed able to support SPP modes. The Bragg cavity on the top surface is designed so as to support a plasmonic Bloch mode exhibiting slow light propagation that enhances light-matter interaction and increase waveguide sensitivity. Upon excitation, these modes can interfere at the output photonic waveguide 707 realizing the desired single-arm interferometer. The top metal surface is exposed to the sample under test and, thus, will serve as the sensing arm, while the bottom surface has the role of the reference arm. Apart from avoiding the noise originating from the different perception of environmental variations by spatially separated signal constituents, the bimodal configuration reduces significantly the sensor footprint.

REFERENCES

[1] E. Chatzianagnostou et. al., "Scaling the Sensitivity of Integrated Plasmo-Photonic Interferometric Sensors", ACS Photonics 2019, 6, 7, 1664-1673, doi: 10.1021/acsphotonics.8b01683.

[2] X. X. Ma, K. X. Chen, and J. Y. Wu, "Cost-Effective Mach-Zehnder Interferometer Liquid Refractive Index Sensor Based on Conventional Polymer Strip Waveguide," IEEE Photonics J., vol. 13, no. 1, 2021, doi: 10.1109/JPHOT.2020.3041731.

[3] "Integrated plasmo-photonic sensor and method of use", US20200003696A1, AUTH, 2020.

[4] J. Flueckiger et al., "Sub-wavelength grating for enhanced ring resonator biosensor," Opt. Express, vol. 24, no. 14, p. 15672, 2016, doi: 10.1364/oe.24.015672.

[5] Q. Liu et al., "Highly sensitive Mach-Zehnder interferometer biosensor based on silicon nitride slot waveguide," Sensors Actuators, B Chem., vol. 188, pp. 681-688, 2013, doi: 10.1016/j.snb.2013.07.053.

[6] X. Ma, K. Chen, J. Wu, and L. Wang, "Low-Cost and Highly Sensitive Liquid Refractive Index Sensor Based on Polymer Horizontal Slot Waveguide," Photonic Sensors, vol. 10, no. 1, pp. 7-15, 2020, doi: 10.1007/s13320-019-0560-y.

[7] B. Y. Fan, F. Liu, Y. X. Li, Y. D. Huang, Y. Miura, and D. Ohnishi, "Refractive index sensor based on hybrid coupler with short-range surface plasmon polariton and dielectric waveguide," Appl. Phys. Lett. 100(11), 111108 (2012).

[8] X. Sun, D. Dai, L. Thylén and L. Wosinski, "Double-Slot Hybrid Plasmonic Ring Resonator Used for Optical Sensors and Modulators," Photonics 2(4), 1116-1130 (2015).

[9] X. Sun, D. Dai, L. Thylén, and L. Wosinski, "High-sensitivity liquid refractive-index sensor based on a Mach-Zehnder interferometer with a double-slot hybrid plasmonic waveguide," Opt. Express 23(20), 25688-25699 (2015).

[10] X. Sun, L. Thylén, and L. Wosinski, "Hollow hybrid plasmonic Mach-Zehnder sensor," Opt. Lett. 42(4), 807-810 (2017).

[11] A. Manolis et al., "Ultra-sensitive refractive index sensor using CMOS plasmonic transducers on silicon photonic interferometric platform", Opt. Express, vol. 28, no. 14, p. 20992, 2020, doi: 10.1364/oe.383435.

[12] Vala, M; Etheridge, S; Roach, J. A.; Homola, J. Long-range surface plasmons for sensitive detection of bacterial analytes, Sensors and Actuators B 2008, 139, 59-63.

[13] A. Gervais et. al., "Design of Slow-Light Subwavelength Grating Waveguides for Enhanced On-Chip Methane Sensing by Absorption Spectroscopy", IEEE JSTQE, vol. 25, no. 3, May/June 2019.

[14] P. Jean, A. Gervais, and S. LaRochelle, "Slow Light in Subwavelength Grating Waveguides", IEEE JSTQE, vol. 26, no. 2, March/April 2020.

[15] J. Zhang, L. Cai, W. Bai and G. Song, "Flat Surface Plasmon Polariton Bands in Bragg Grating Waveguide for Slow Light", JLT, vol. 28, no. 14, 2010.

[16] Y. Huang, C. Min, P. Dastmalchi and G. Veronis, "Slow-light enhanced subwavelength plasmonic waveguide refractive index sensors", Optics Express vol. 23, no. 11, May 2015.

[17] Y. Huang, C. Min, S. Tao, and G. Veronis, "Design of Compact Mach-Zehnder Interferometer Based Slow-Light Enhanced Plasmonic Waveguide Sensors", Journal of Lightwave Technology, vol. 34, No. 11, 2016

[18] K. Qin, S. Hu, S. Retterer, I. Kravchenko and S. Weiss, "Slow light Mach-Zehnder interferometer as label-free biosensor with scalable sensitivity", Optics Letters, vol. 41, no. 4, 2016.

[19] L. Torrijos-Morán, A. Griol and J. García-Rupérez, "Slow light bimodal interferometry in one-dimensional photonic crystal waveguides", Light: Sciences and Applications, 10:16, 2021.

[20] E. Chatzianagnostou, A. Manolis, A. Miliou, D. Tsiokos and N. Pleros, "Theory and Sensitivity Optimization of Plasmo-photonic Mach-Zehnder Interferometric Sensors," in Journal of Lightwave Technology, vol. 39, no. 15, pp. 5206-5217 Aug. 1, 2021, doi: 10.1109/JLT.2021.3083365.

[21] E. Melnik et al., "Surface Modification of Integrated Optical MZI Sensor Arrays Using Inkjet Printing Technology", Sensors Actuators, B Chem., vol. 236, pp. 1061-1068, 2016, doi: 10.1016/j.snb.2016.05.121.

The invention claimed is:

1. Optical waveguide interferometric sensing device, esp. biosensor, in photonic integrated circuits apparatus, comprising a waveguide layer for receiving an optical signal and propagating said optical signal in accordance with a predetermined optical waveguide propagation mode, and a testing medium surface in communication with the waveguide layer and responsive to a testing medium for modifying at least one characteristic of the propagated optical signal in relation to a given parameter of said testing medium, whereby the modified characteristic of the propagated optical signal is measurable in view of determining the given parameter of said testing medium, wherein said device comprises biosensors, resp. photonic and plasmonic components (101, 102, 111) in specifically designed MZI configurations (101), especially planar plasmonic waveguides (111), which are monolithically integrated in photonic integrated circuits, wherein it comprises Bragg-grating-based plasmonic waveguides (402, 502, 602, 609), which are co-integrated with photonic waveguides (102, 605, 606), which consist of integrated waveguides, wherein a slow light mechanism means is incorporated in the device being used with Bragg diffraction barrier means (602) in order to boost sensitivity to unprecedented levels retaining a short transducer length, wherein means with a length of photonic waveguide in one MZI branch are incorporated in the device thereby increasing the free spectral range (FSR) for improving sensitivity, as well as tailoring means for tailoring the photonic geometry, taking into account a second order dispersion in the plasmo-photonic MZI branches (605, 606).

2. Device according to claim 1, wherein a plasmonic stripe waveguide (608, 609) is incorporated within a photonic MZI sensor means (101).

3. Device according to claim 2, wherein said plasmonic stripe waveguide (111, 608, 609) has a width of a few microns and a length of a few tens of microns.

4. Device according to claim 2, wherein it comprises Bragg-grating-based plasmonic waveguides co-integrated with photonic waveguides, whereby it boosts sensitivity performance to >130,000 nm/RIU while reducing overall footprint and noise.

5. Device according to claim 1, wherein Bragg-grating-decorated plasmonic thin-film waveguides (608, 609) are incorporated in said device, wherein slow light phenomena are exerted, through which the effective exposure of the plasmonic field to the overlining analyte is increased, by means whereof the waveguide and the architectural sensitivity are increased.

6. Device according to claim 1, wherein dielectric loading means are incorporated on top of said plasmonic stripe (111; 608, 609), through which a Bragg cavity configuration (402, 502, 602, 703) is generated, by means whereof the effective exposure time of said plasmonic field is maximized.

7. Device according to claim 6, wherein Pérot-Fabry-decorated plasmonic thin films are incorporated in said device by means whereof both the waveguide and architectural sensitivity are increased, wherein the propagation of a surface plasmon mode is supported by an aluminum metallic film embedded within an aqueous solution, further wherein the sensitivity of the surface plasmon polariton (SPP) mode to a surface modification is evaluated by applying a refractive index change to a d layer on top of the metal film over a finite propagation length (L).

8. Device according to claim 7, wherein for a thin film mode, a phase change $\Delta\phi_F$ corresponding to a phase sensitivity of the thin-film surface plasmon polariton (SPP) mode to surface modification of $$S_\phi = \Delta\phi_F/((\Delta nd)L)$$

is generated by means of said surface modification.

9. Device according to claim 7, wherein same is applied to said SPP modes transmitted through plasmonic Pérot-Fabry cavities comprised of dielectric-loaded Bragg mirrors, by means whereof an increased phase change $\Delta\phi_c$ is generated from which a sensitivity enhancement factor $\eta=\Delta\phi_c/\Delta\phi_F$ with respect to bare thin film configuration is extracted.

10. Device according to claim 7, wherein more periods, esp. 2 or 3, are introduced by virtue whereof said factor scales with field enhancement within the cavity, further wherein coupled-cavities are deployed with said SPP mode hopping from one cavity to the other, by means whereof an increase of the sensitivity by one order of magnitude is generated, through which an ultra-high sensitivity of 130,000 nm/RIU is accomplished with either a shorter plasmonic waveguide lengths reducing footprint and losses, or a smaller free spectral range (FSR) yielding a device with increased tolerance.

11. Device according to claim 1, wherein it comprises a balanced Mach Zehnder interferometer (MZI) having both arms host identical photonic and plasmonic stripe waveguide sections, wherein dielectric ridges (602) are located on top of the plasmonic stripes (608, 609) which enable slow-light propagation; further wherein to accommodate sensing, only one of the two plasmonic waveguides (608, 609) gets functionalization thereby serving as the sensing transducer, whereas the respective plasmonic waveguide (609) in the reference branch (606) is coated with blocking agents serving as a reference, by virtue whereof when the liquid sample flows over both arms (605, 606), binding events occur only in the sensing arm (605), which generates local refractive index (RI) changes that are detected by the sensing waveguide (608).

12. Device according to claim 10, wherein the same plasmonic waveguide is further incorporated in the reference arm (609), thereby enhancing sensitivity and improving the limit of detection.

13. Device according to claim 12, wherein optical losses between the two branches (605, 606) are balanced, yielding a high extinction ratio at the interferometer output.

14. Device according to claim 12, wherein noise originating from temperature variations, non-specific binding or varied bulk refractive index during sample loading is cancelled out.

15. Device according to claim 14, wherein thermo-optic phase shifters are provided at every MZI branch (605, 606), by means whereof the MZI resonance is aligned within the spectral window of the light source.

16. Device according to claim 15, wherein the noise-resilient character of the balanced MZI is combined with advanced data processing and noise cancellation techniques being employed at the electronic read-out system, thereby allowing for low LoD values.

17. Device according to claim 1, wherein an alternative noise-resilient architecture includes the deployment of a single-arm bimodal interferometer (701), wherein two access photonic waveguides are provided that are separated by a metal stripe (705) located on top of thinner photonic layer (704), further wherein a dielectrically loaded Bragg-cavity (703) is incorporated on the top-interface (707) of the plasmonic stripe waveguide (705), at the plasmonic region whereof two metal/insulator interfaces are formed to support SPP modes.

18. Device according to claim 17 wherein the Bragg cavity on the top surface supports a plasmonic Bloch mode exhibiting slow light propagation that enhances a light-matter interaction and increase the waveguide sensitivity; further wherein upon excitation, these modes interfere at the output photonic waveguide thus realizing a single-arm interferometer; further wherein said top metal surface serves as the sensing arm, while the bottom surface serves as the reference arm, thus generating a bimodal configuration reducing the sensor footprint.

19. Device according to claim 18, wherein said free spectral range (FSR) is selected larger than 100 nm, wherein the width of said photonic waveguide (102) is optimized in combination with a large free spectral range (FSR), thereby bringing sensitivity close to 130,000 nm/RIU.

20. Method for carrying out an optical waveguide interferometric sensing device, esp. biosensor, in photonic integrated circuits as defined in claim 1, wherein the waveguide layer receives an optical signal and propagates said optical signal in accordance with a predetermined optical waveguide propagation mode, and a testing medium surface in communication with the waveguide layer and responsive to a testing medium for modifying at least one characteristic of the propagated optical signal in relation to a given parameter of said testing medium, whereby the modified characteristic of the propagated optical signal is measured for determining the given parameter of said testing medium, wherein said biosensor, resp. photonic and plasmonic components (101, 102, 111) in specifically designed MZI configurations (101), esp. planar plasmonic waveguides (111), are monolithically integrated in photonic integrated circuits, further wherein the Bragg-grating-based plasmonic waveguides (402, 502, 602, 609) are co-integrated with photonic waveguides (102, 605, 606) consisting of integrated waveguides, wherein a slow light mechanism means is incorporated in the device being used with Bragg diffraction barrier means (602) boosting sensitivity retaining a short transducer length.

* * * * *